Jan. 12, 1965  R. R. F. MARTIN  3,164,965
BOAT LAUNCHING DEVICE
Filed March 8, 1963  2 Sheets-Sheet 1

INVENTOR.
RAYNALD R. F. MARTIN
BY
*John H. Widdowson*
*Attorney*

Jan. 12, 1965  R. R. F. MARTIN  3,164,965
BOAT LAUNCHING DEVICE
Filed March 8, 1963  2 Sheets-Sheet 2

INVENTOR.
Raynald R. F. Martin
BY John H. Wilkinson
attorney

United States Patent Office

3,164,965
Patented Jan. 12, 1965

3,164,965
BOAT LAUNCHING DEVICE
Raynald R. F. Martin, 710 Beverly Drive, Wichita, Kans.
Substituted for abandoned application Ser. No. 26,188,
May 2, 1960. This application Mar. 8, 1963, Ser. No. 266,129
3 Claims. (Cl. 61—67)

This invention relates to a device used in launching boats, and more particularly to a combination launching device and a safety means to prevent an automobile from accidentally rolling into the water during the boat launching operation.

Heretofore many types of boat launching devices have been known. These devices are constructed in many different ways to rotate, lift, or slide a boat from a trailer into the water. These devices are complicated in construction, requiring many moving parts, and no means has been provided to prevent the pulling vehicle from rolling onto the launching device and into the water.

In accordance with the present invention, a new boat launching device has been provided by which a trailer having a boat thereon can cross the device, which tilts to direct the trailer and boat into the water, where the boat is then removed in the usual manner. As the boat launching device of the invention moves about its axis, one edge is lowered to the ground near the lake, and the other edge is lifted to engage the pulling vehicle to thereby prevent the pulling vehicle from accidentally rolling across the launching device and into the water.

The structure of the boat launching device includes a short support. An axle is received on the top of the support and has an elongated plate mounted thereon. The plate is wide enough to receive the wheels of the boat trailer. The outer surface of the plate is preferably curved for best results in launching.

Accordingly, it is an object of this invention to provide a new boat launching device.

Another object of the invention is to provide a new boat launching device incorporating a safety feature to prevent the pulling vehicle from accidentally backing into the water.

A further object of the invention is to provide a new boat launching device having a minimum of moving parts which can be economically constructed and installed.

A still further object of the invention is to provide a new boat launching device having a plate across which the boat trailer travels which is concave in the outer edge portions and convex the intermediate portion thereof.

Another object of the invention is to provide a new boat launching device which is so constructed so that each edge of the device can be temporarily locked in position with either the front or rear edge of the device near the ground.

Various other objects, advantages and features of the invention will become apparent from the following description, taken in connection with the accompanying drawings, in which.

Figure 1:
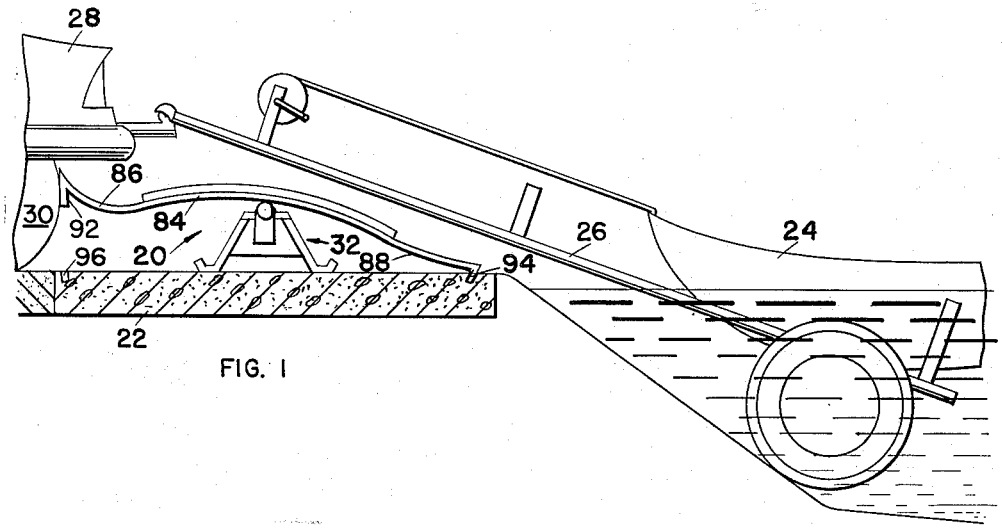
FIG. 1 illustrates the boat launching device of the invention in operation.

The following is a discussion and description of a preferred specific embodiment of the new boat launching device of the invention, such being made with reference to the drawings whereon the same reference numerals are used to indicate the same or similar parts and/or structure. It is to be understood that such discussion and description is not to unduly limit the scope of the invention.

Referring now to the drawings in detail, the boat launching device of the invention is shown in FIG. 1 during the boat launching operation. The boat launcher, shown generally at 20, is preferably rigidly secured in a supporting concrete platform 22. The boat 24 is mounted on a conventional trailer 26. The trailer is pulled by an automobile 28, or any other suitable pulling vehicle. As will be observed from FIG. 1, when the boat and trailer are in launching position in the water the launching device 20 is positioned so that one edge thereof engages the tire 30, or other portions of the pulling vehicle to prevent the vehicle from accidentally rolling into the water due to the lack of experience of the driver, brake failure, etc.

Figure 3:
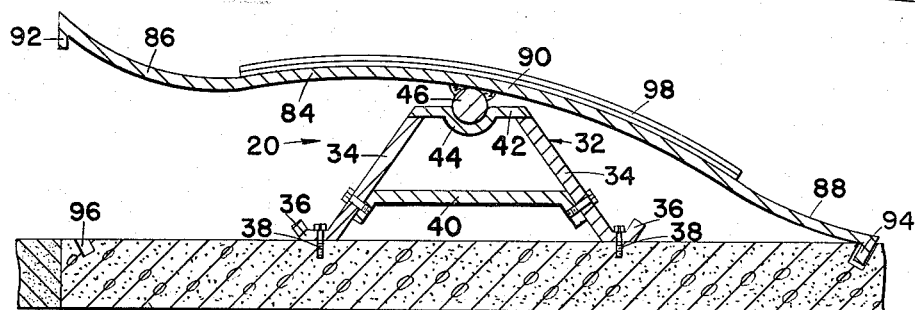
FIG. 3 is an enlarged cross section view taken along the line 3—3 of FIG. 2.

As best seen in FIG. 3, the boat launching device has an open support 32 which includes a number of spaced diverging legs 34 having feet 36 thereon to rest on the support 22. The feet 36 can either be formed integrally with the legs 34, or they can be made separate and secured thereon in any suitable manner. The feet 36 can be secured to the concrete platform 22 by mounting bolts 38 or other suitable means. A plurality of cross braces 40 extend between the legs 34 to reinforce the support 32. The support 32 has a generally horizontal portion 42 which joins the top ends of the legs 34 and is rigidly secured thereto in any suitable manner, such as by welding. The horizontal portion 42 extends the full length of the support 32, and a longitudinally extending recess 44 is formed in the horizontal portion 42, preferably at the center thereof. The recess 44 is preferably semicircular as shown in the drawings, however any recess that is arcuate in cross section would be satisfactory.

The recess 44 receives an axle 46 which extends the full length of the support 32 and projects from both ends thereof. The axle 46 is rotatably and removably mounted in the recess 44.

Means are provided with the device of the invention so that it can be removably locked in position with either end touching the platform 22. This structure is located on the extending ends of the shaft 46, preferably at both ends thereof, and is best illustrated in the drawings in FIGS. 4 through 11.

Each end of the support 32 has a cover plate 50 rigidly and removably secured thereto, such as by bolts 52 which extend through the edge portions 54 of the cover plate 50. The edge portions 54 of the cover plate 50 are bent along the dotted lines in FIG. 5 and positioned on the support 32 so that the bolts 52 pass through the cross braces 40 and the legs 34. Suitable mounting holes 53 can be formed in the edge portions 54 to facilitate the mounting of plate 50. Other mounting means can, of course, be used. The axle 46 projects through the opening in the top portion of the cover plate.

Each of the cover plates 50 has a mounting plate 56 secured thereto which also receives the axle 36 therethrough. The mounting plate 56 can be secured to the cover plate 50 by any suitable means, such as by the mounting bolts 58 passing through the holes 59.

Figures 7, 9, 11:
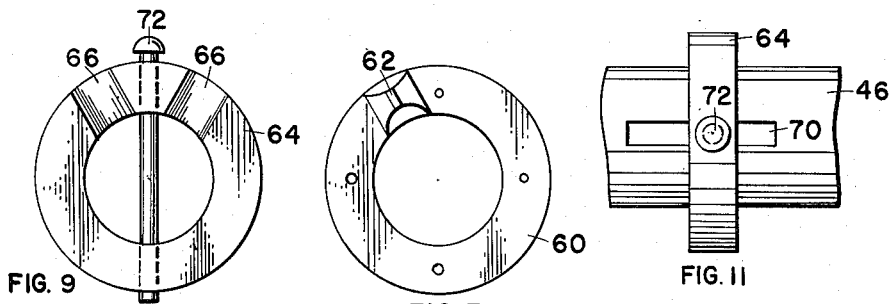
FIG. 7 is an elevation view of one of the annular elements of the locking device of the invention.
FIG. 9 is an elevation view of the other annular element of the locking device of the invention.
FIG. 11 is a top plan view showing the mounting of the annular element of FIGS. 9 and 10 on the shaft.
Figures 8, 10:
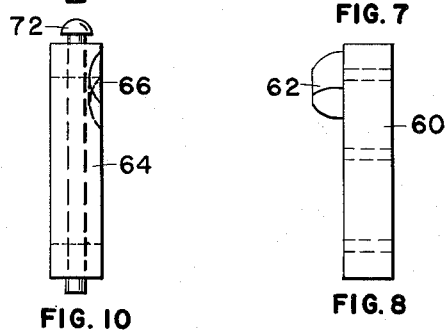
FIG. 8 is a side view of the element shown in FIG. 7.
FIG. 10 is a side view of the element shown in FIG. 9.

Each of the projecting end portions of the axle has a first annular metallic member 60 surrounding it which is rigidly secured to the outer side of the mounting plate 56. The annular member 60 has a projection 62 on the outside surface thereof. The projection 62 is preferably formed with a flat edge, as best seen in FIGS. 7 and 8. However the projection 62 can merely be a small arcuate projection.

Each projecting end portion of the axle 46 also has a second annular metallic member 64 positioned thereon. The member 64 has two small spaced recesses 66 on the inside surface. The recesses 66 are generally arcuate cut-outs, but can be formed in various shapes. The recesses 66 and the projection 62 are dimensioned so that the projection 62 can be received within the recesses 66, and the members 60 and 64 are mounted on the axle so that the projection 62 and recesses 66 are facing each other.

A slot 70 is cut through the axle 46 from approximately the point where each annular member 60 surrounds the axle toward the adjacent end of the axle 46 for a distance of 1 to 2 inches. The slot 70 is preferably cut diametrically through the axle 46, and is closed at both ends. Each of the second annular members 64 has a pin 72 extending therethrough which passes through the slot 70. The pin 72 mounts the member 64 on the axle 46 so that the member 64 will rotate with the axle 46, and can move longitudinally along the axle.

Each end of the axle 46 has a first washer 74 slidably received thereon which abuts the second annular member 64. Each end of the axle 46 also has a helical metallic spring 76 coaxially mounted on the axle and engaging the washer 74.

Figure 2:
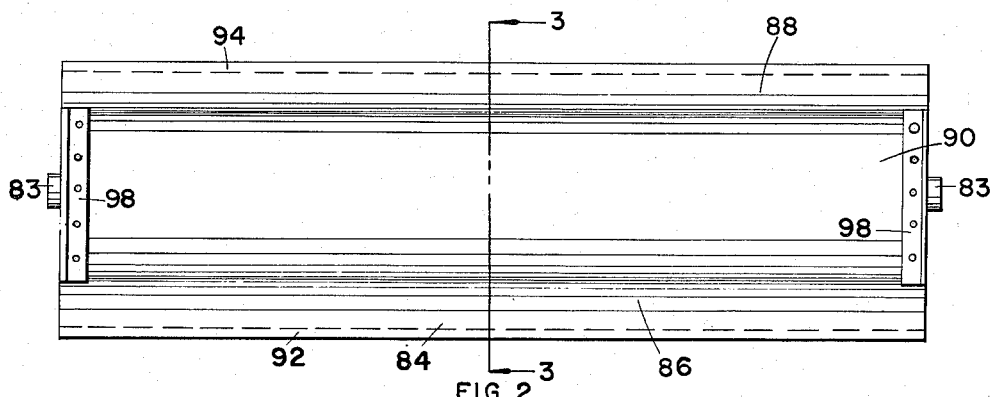
FIG. 2 is an enlarged top plan view of the device of the invention.

Each end of the axle also has a second washer 78 thereon which engages the outer end of the spring 76. Lock nuts 80 and 82 are threadedly mounted on each end of the axle 46 and complete the assembly on the projecting ends of the axle. The springs 76 are compressed between the washers 74 and 78 by tightening the lock nuts 80 and 82, and the springs act against the second annular member 64 to continually urge it along the slot 70 toward the member 60 so that the recesses 66 and the projection 62 are urged into mating engagement. End caps 83 (FIG. 2) can be provided to cover the projecting ends of the axle 46.

Figure 4:
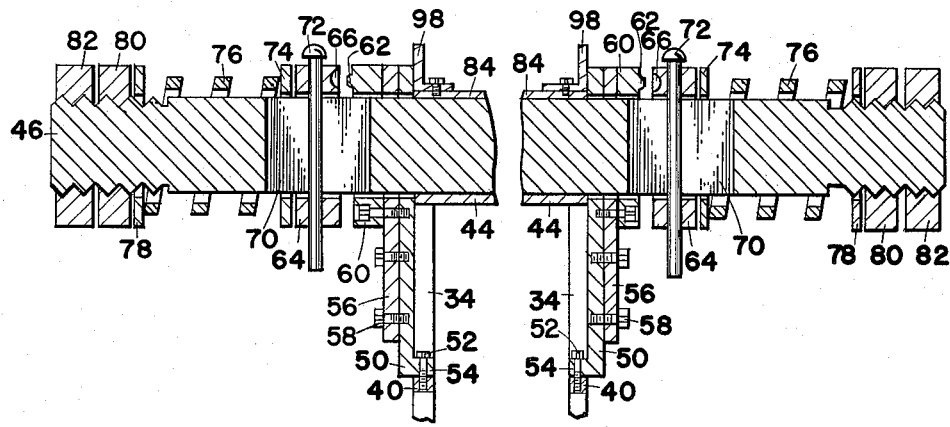
FIG. 4 is a partial cross section view along the axle of the device showing the various elements making up the locking structure.
Figures 5, 6:
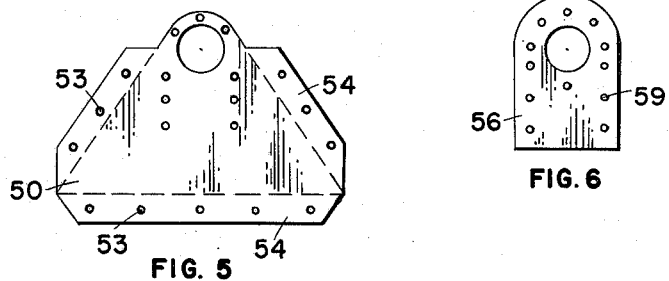
FIG. 5 is an enlarged side elevation view of the cover plate of the device prior to installation.
FIG. 6 is a view of the mounting plate.

An elongated plate 84 is rigidly secured to the axle 46 between the cover plates 50 in any suitable manner, such as welding. The side portions 86 and 88 of the plate 84 are preferably concave and the center portion 90, or portion over the axle 46, is preferably convex. In some applications, it will be desirable for the concave portion 86 to be of a smaller radius than a concave portion 88. The radii of the concave portions are chosen so that the end of the plate 84 will be elevated to the required height to engage the pulling vehicle 28 during the boat unloading operation. A depending flange 92 is secured to the end of the concave portion 86, and a second and similar depending flange 94 is secured to the end of the concave portion 88. Suitable recesses or slots 96 can be formed in the supporting platform 22 to receive these flanges and facilitate the backing of the trailer thereover. Each side of the plate 84 has an angle iron 98 secured thereto which extends upwardly as shown. The angle irons 98 abut the cover plates 50 as best seen in FIG. 4.

With the boat launcher 20 mounted on the platform 22 adjacent to the shoreline as shown in FIG. 1 it is prepared for the launching of a boat. It is positioned so that the flange 92 is in one of the slots 96 of the platform, and the other flange 94 is elevated. The pulling vehicle 28 backs the trailer 26 having the boat 24 thereon across the concave portion 86 and over the convex portion 90 of the plate 84. As the wheels of the trailer 26 pass over the axle 46, the plate will tilt and the flange 94 will then be received in the other slot 96 and the flange 92 will be lifted off the ground to act as a stop for the vehicle 28. The trailer 26 will then move across the other concave portion 88 and into the lake until the boat 24 floats, and it is then released from the trailer 26 in the usual manner. As the empty trailer 26 is pulled from the water across the plate 84, the plate 84 again tilts and is returned to its original position, that is with the flange 92 in the slot 96. It is then in position to receive another boat trailer.

When the flange 92 is in the slot or opening 96, the projection 62 on the first annular member 60 is engaged in one of the recesses 66 of the second annular member 64. The member 64 is urged against the member 60 by the force of the helical spring 76. As the device moves from one position to the other during the unloading operation as hereinbefore described, the member 64 will rotate with the axle 46, and the member 60 will remain stationary with the mounting member 56. As the axle begins to turn, the member 64 will move longitudinally along the axle 46 against the force of the spring 76 and disengage the projections 62 from one of the recesses 66. The axle 46 and member 64 will continue to rotate until the projection 62 is engaged in the other recess 66. The recesses 66 are spaced so that this will occur when the launcher 20 has reached its other extremity, that is, when the flange 94 is within the slot 96. The engagement of the projection 62 in the two spaced recesses 66 as hereinbefore described serves to retain or lock the launcher 20 in either position, that is with the flange 94 engaging the slot 96 in the platform 22, or with the flange 92 engaging the slot 96 in the platform. Thus, with the trailer backed into the water as shown in FIG. 1 the concave portion 88 stands ready to receive the wheels of the trailer 26 as it is pulled from the lake after the boat is launched. As the boat trailer 26 crosses from the concave portion 88 of the plate 84 to the concave portion 86 the operation hereinbefore described will be reversed and the concave portion 86 and the flange 92 will be in the down position, and will remain in this position until another trailer moves across the launcher. The recesses 66 are, of course, positioned so that the device is locked in its two extreme positions. The locking structure has been described as being mounted on each projecting end of the axle 46, however in some cases this structure can be provided on only one end of the axle. Also, the projection 62 can be formed on the member 64 and the recesses 66 on the member 60, it being only necessary that the recesses and projection face each other.

The boat launcher 20 of the invention can be permanently mounted near the water as hereinbefore described. At some locations it will be desirable to merely use the device temporarily, and then the flat feet 36 will be placed directly on the shoreline, without the use of a mounting platform.

Also, while the plate 84 has been described as being one rather long, narrow piece of material, it will be desirable for some applications to make the concave and convex portions separate and secure them together in any suitable manner. Furthermore, while the previous description of the invention has been directed to the use of one long plate 84 to receive both of the wheels of the vehicle, it is to be understood that the device can be shortened considerably so that the plate 84 is only wide enough to adequately receive one wheel, and then two of the devices spaced the required distance apart can receive individual wheels of the trailer 26. This last mentioned construction reduces the cost of the rather long plate 84 and requires installation of the structure surrounding the projecting ends of the axle 46 on both parts.

While the specific locking mechanism described hereinabove has been found desirable for this particular application, it is to be understood that other means of locking or holding the boat launching device 20 in either of the two positions hereinbefore described is within the scope of this disclosure. Furthermore, resilient means other than the springs 76 can be used, and in some applications the washers 74 and 78 can be dispensed with. Also, while the described shape of the plate 84 is considered particularly desirable, other shapes can of course be used in some applications.

While the invention has been described in connection with a preferred specific embodiment thereof, it will be understood that it is intended to illustrate and not to limit the scope of the invention, which is defined by the claims.

As will be evident to those skilled in the art, various modifications of this invention can be made, or followed, in the light of this description and discussion, without departing from the spirit of the disclosure or the scope of the claims.

I claim:

1. A boat launching device of the type described comprising, in combination, an open support, said support having spaced diverging legs with integral flat feet, means to secure said feet to a concrete platform, a plurality of cross-braces extending between and secured to said legs, said support having a generally horizontal portion joining the top ends of said legs and extending the length of said support, a semi-circular recess formed in said horizontal portion, an elongated axle rotatably and removably mounted in said semi-circular recess and projecting from both ends of said support, said axle being threaded at both ends thereof, each end of said support having a cover plate rigidly secured thereto through which said axle projects, each of said cover plates having a mounting plate secured thereto and receiving said axle therethrough, each of the projecting end portions of said axle having a first annular metallic member mounted therearound and rigidly secured to the outer side of said mounting plates, said annular members having a projection on the outside surface thereof, each of the projecting end portions of said axle having a second annular metallic member mounted therearound and being longitudinally slidable thereon, each of said second annular members having two spaced recesses on the inside surface thereof of such size as to receive said projection on said first annular metallic members and said annular members being mounted on said axle so that said projecting portion of each of said first annular members is receivable within said recesses in each of said second annular members, each of the projecting end portions of said axle having a short closed longitudinal slot therethrough, each of said second annular members and said slots at each end of said axle having a pin extending therethrough to provide for rotational movement of said second annular members with and longitudinal movement along said axle, each end of said axle having a first washer slidably received thereon abutting said second annular member, each end of said axle having a helical metallic spring coaxially mounted on said axle and engaging said washers, each end of said axle having a second washer slidably received thereon and engaging the outer end of said springs, each end of said axle having lock nuts threadedly mounted thereon engaging said second washers and compressing said helical springs to continually urge said second annular members against said first annular members, an elongated plate rigidly secured to said axle between said cover plates, said elongated plate being concave in the portion on either side of said axle and convex across the middle portion thereof, each end of said elongated plate having a depending flange, and each side of said plate having an upwardly extending angle iron rigidly secured thereto and abutting said cover plate, said device being constructed and adapted so that a trailer having a boat mounted thereon can be backed across said elongated plate from one concave portion thereof to the other concave portion thereof and be lowered into a lake so that as the wheels of said trailer cross the second concave portion the first concave portion will be raised and said flange thereon will engage the wheels of the pulling vehicle to prevent said vehicle from rolling into said lake, and said projections on said first annular members will be disengaged from one of said recesses in said second annular members and engaged in the other of said recesses in said second annular members to retain said plate in position during the unloading of said boat from said trailer.

2. A boat launching device of the type described comprising, in combination, an open support, said support having spaced diverging legs, a plurality of cross braces extending between said legs, said support having a generally horizontal portion joining said legs and extending the length of the support, a recess formed in said horizontal portion, an axle rotatably and removably mounted in said recess and projecting from both ends of said support, each end of said support having a cover plate rigidly secured thereto through which said axle projects, each of said cover plates having a mounting plate secured thereto, each of said mounting plates having a first annular metallic member mounted thereon and receiving said axle, said annular member having a projection on the outside surface thereof, each of the projecting portions of said axle having a second annular metallic member mounted therearound, each of said second annular members having spaced recesses on the inside surface thereof and dimensioned to receive said projection on said first annular metallic member, each of the projecting portions of said axle having a closed longitudinally extending slot therethrough, each of said second annular members and said slots on each end of said axle having a pin therethrough mounting said second annular member on said axle for rotation therewith and longitudinal movement therealong, each end of said axle having a helical metallic spring coaxially mounted thereon, each end of said axle having a lock nut mounted thereon and compressing said helical springs to continually urge said second annular member against said first annular member, a plate rigidly secured to said axle between said cover plates, said plate having a concave portion on either side of said axle and a convex portion across the middle thereof, said device being constructed and adapted so that a trailer having a boat mounted thereon can be backed across said plate from one concave portion thereof to the other concave portion thereof and be lowered into the water so that as the wheels of the trailer cross the second concave portion the first concave portion will be raised and said plate will engage the wheels of the pulling vehicle to prevent said vehicle from rolling into the water, and said projection on said first annular member will be disengaged from one said recesses in said second annular member and engaged in the other of said recesses in said second annular member to retain said plate in position.

3. A boat launching device of the type described comprising, in combination, a support, said support having a generally horizontal portion, a recess in said horizontal portion, an axle rotatably and removably mounted in said recess and projecting from both ends of said support, each end of said support having a cover plate rigidly secured thereto through which the axle projects, each of the projecting end portions of said axle having a first annular metallic member mounted therearound and being rigid with said cover plate, said annular members having a projection on the outside surface thereof, each of the projecting end portions of said axle having a second annular metallic member therearound, each of said second annular members having a plurality of spaced recesses on the inside surface thereof, said annular members being mounted on said axle so that said projections on said first annular members is receivable within said recesses of said second annular members, each end of the projecting end portions of said axle having a closed longitudinal slot therethrough, each of said second annular members and said slot at each end of said axle having a pin extending therethrough to mount said second annular member on said axle for rotation therewith and longitudinal movement therealong, each end of said axle having a lock nut threadedly mounted thereon, resilient means mounted between said lock nuts and said second annular member to continually urge said annular member into engagement with said first annular member, and a plate secured to said axle between said cover plates, said device being constructed and adapted so that a trailer having a boat thereon can be backed across said plate and into the water so that as the wheels of said trailer cross said plate from one side to the other said plate will be raised to engage the wheels of the pulling vehicle to prevent said vehicle from rolling into said water, and said projections on said first annular member will be disengaged from one of said recesses in said second annular member and engaged in another of said recesses in said second annular member.

References Cited by the Examiner

UNITED STATES PATENTS

| | | | |
|---|---|---|---|
| 1,687,174 | 10/28 | Mountford et al. | 16—140 |
| 2,446,275 | 8/48 | Glasin | 272—54 |
| 2,754,017 | 7/56 | Hart et al. | 61—67 X |
| 2,839,298 | 6/58 | Manocchia | 272—54 |
| 2,890,477 | 6/59 | Miller | 16—140 |

FOREIGN PATENTS 278,291   10/27   Great Britain.

EARL J. WITMER, *Primary Examiner.*

JACOB I. NACKENOFF, JACOB SHAPIRO,
*Examiners.*